US012759075B2

(12) United States Patent
Haliyo et al.

(10) Patent No.: US 12,759,075 B2
(45) Date of Patent: Oct. 13, 2026

(54) DEVICE FOR CONTROLLING THE AXIAL POSITION OF A LASER FOCAL POINT PRODUCED BY A MICROSCOPE OBJECTIVE

(71) Applicants: Sorbonne Université, Paris (FR); Centre National de la Recherche Scientifique, Paris (FR)

(72) Inventors: Sinan Haliyo, Paris (FR); Stéphane Régnier, Paris (FR); Edison Gerena, Paris (FR)

(73) Assignees: Sorbonne Université, Paris (FR); Centre National de la Recherche Scientifique, Paris (FR)

(*) Notice: Subject to any disclaimer, the term of this patent is extended or adjusted under 35 U.S.C. 154(b) by 770 days.

(21) Appl. No.: 18/250,939

(22) PCT Filed: Oct. 29, 2020

(86) PCT No.: PCT/IB2020/001123
§ 371 (c)(1),
(2) Date: Apr. 27, 2023

(87) PCT Pub. No.: WO2022/090760
PCT Pub. Date: May 5, 2022

(65) Prior Publication Data
US 2023/0398629 A1 Dec. 14, 2023

(51) Int. Cl.
*B23K 26/064* (2014.01)

(52) U.S. Cl.
CPC ................................ *B23K 26/0643* (2013.01)

(58) Field of Classification Search
CPC ............ B23K 26/0643; G02B 19/0028; G02B 26/0825; G02B 21/241
See application file for complete search history.

(56) References Cited

U.S. PATENT DOCUMENTS

| | | | | |
|---|---|---|---|---|
| 2001/0033381 A1* | 10/2001 | Stumbo | ................ | G01N 35/028 356/440 |
| 2014/0168614 A1* | 6/2014 | Matsubara | ........... | H04N 9/3158 353/31 |
| 2020/0018940 A1* | 1/2020 | Mertz | ................ | G02B 21/0032 |

FOREIGN PATENT DOCUMENTS

| | | |
|---|---|---|
| DE | 102017119478 A1 | 2/2019 |
| EP | 1744194 A1 | 1/2007 |
| JP | 2005224328 A | 8/2005 |

(Continued)

OTHER PUBLICATIONS

Foreign Communication from a Related Counterpart Application, Japanese Notice of Reasons for Refusal dated May 9, 2024, Japanese Application No. 2023-524481.

(Continued)

*Primary Examiner* — Robert G Bachner
(74) *Attorney, Agent, or Firm* — Conley Rose, P.C.

(57) ABSTRACT

The present invention relates to a device (IO) for controlling the axial position of a laser focal point produced by a microscope objective, comprising:—a laser source for emitting a laser beam,—a deformable mirror for focusing or defocusing the laser beam axially,—a microscope objective for focusing the laser beam coming from the deformable mirror on a laser focal point, characterized in that it further comprises a system for passing the laser beam emitted by the laser source several times through the deformable mirror.

6 Claims, 12 Drawing Sheets

(56) References Cited

FOREIGN PATENT DOCUMENTS

Figure 1:
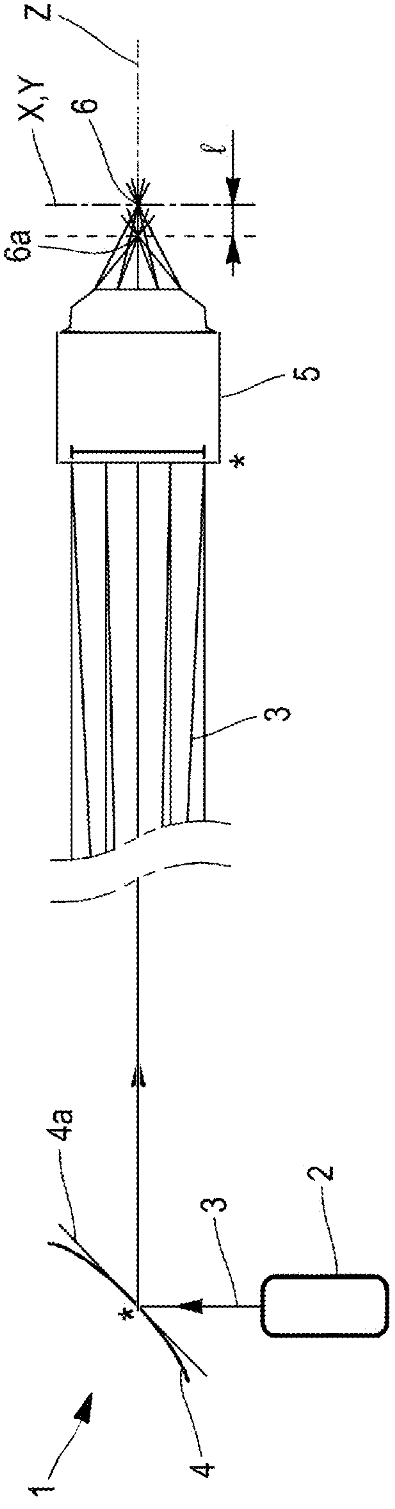

| | | | |
|---|---|---|---|
| JP | 2015018045 | A | 1/2015 |
| WO | 2022090760 | A1 | 5/2022 |

OTHER PUBLICATIONS

Foreign Communication from a Related Counterpart Application, International Search Report and Written Opinion dated Jul. 2, 2021, International Application No. PCT/IB2020/001123 filed on Oct. 29, 2020.

Gerena, et al., "High-Bandwidth 3-D Multitrap Actuation Technique for 6-DoF Real-Time Control of Optical Robots," IEEE Robotics and Automation Letters, vol. 4, No. 2, Apr. 2019, pp. 647-654, DOI: 10.1109/LRA.2019.2892393.

* cited by examiner

[Fig. 3]
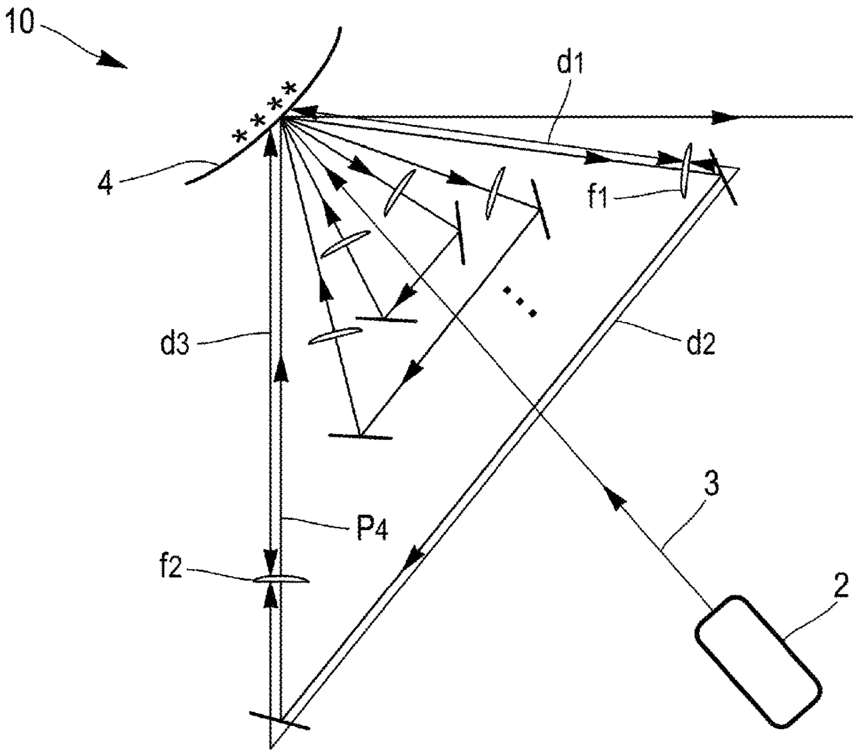
[Fig. 4]
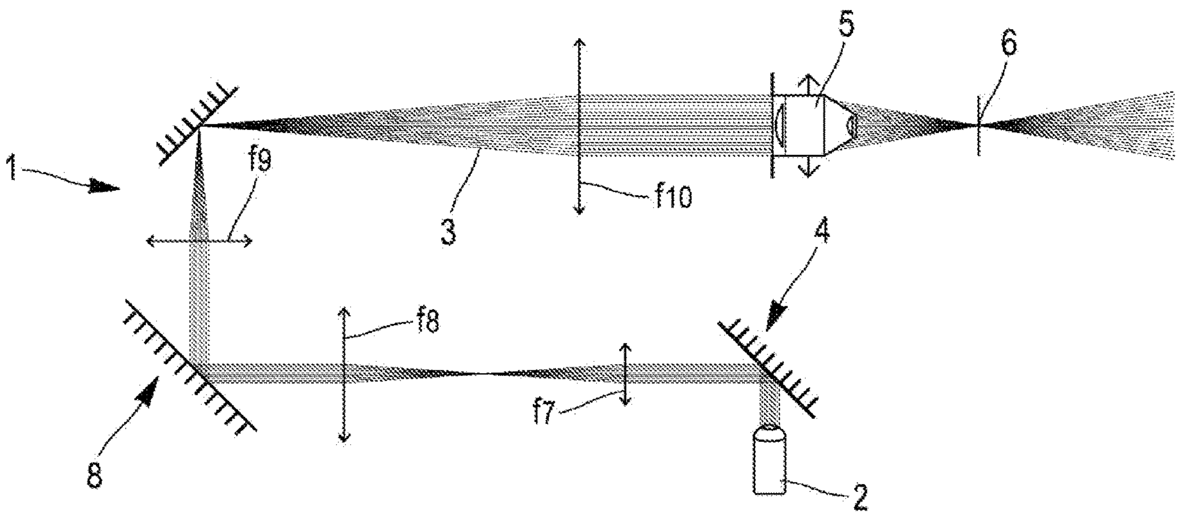

[Fig. 5]
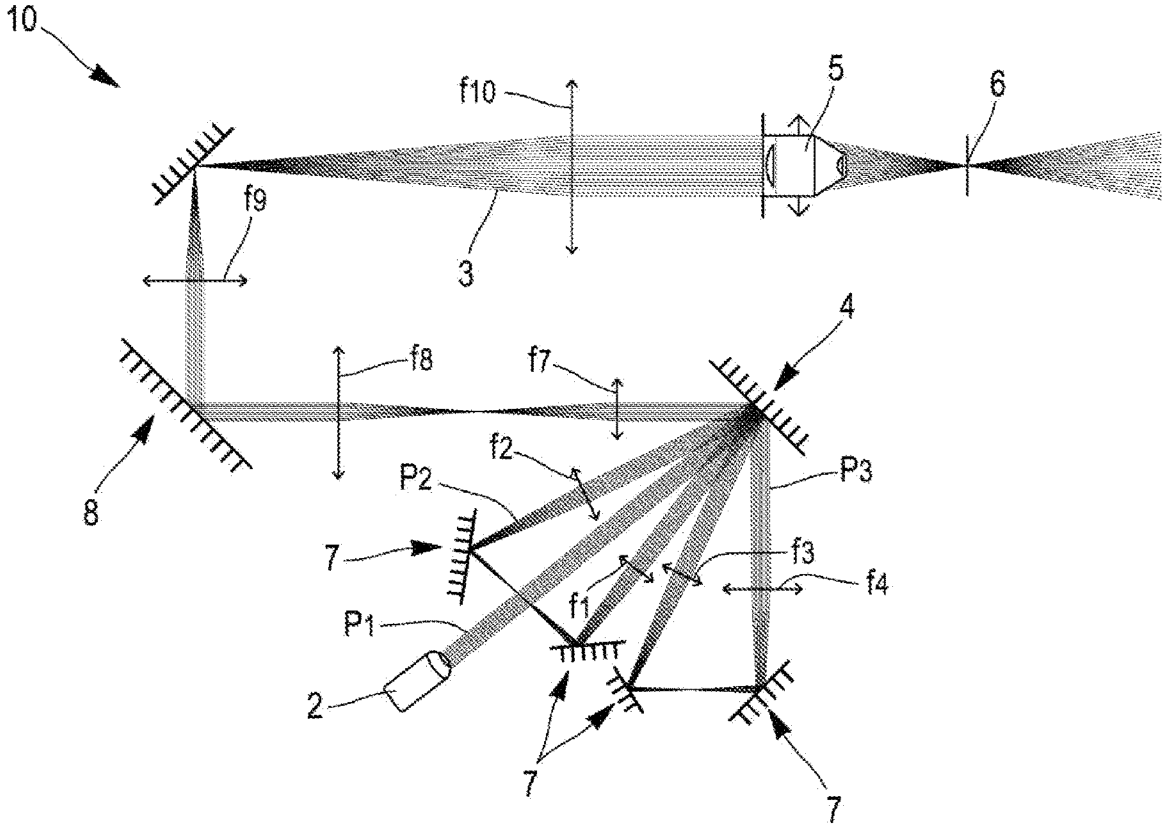
[Fig. 6]
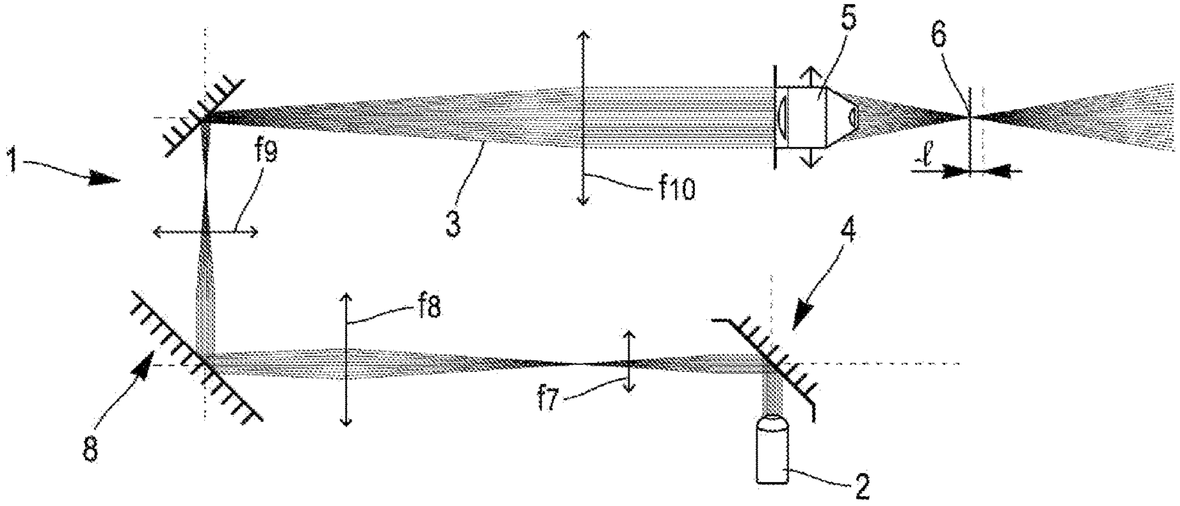

[Fig. 7]
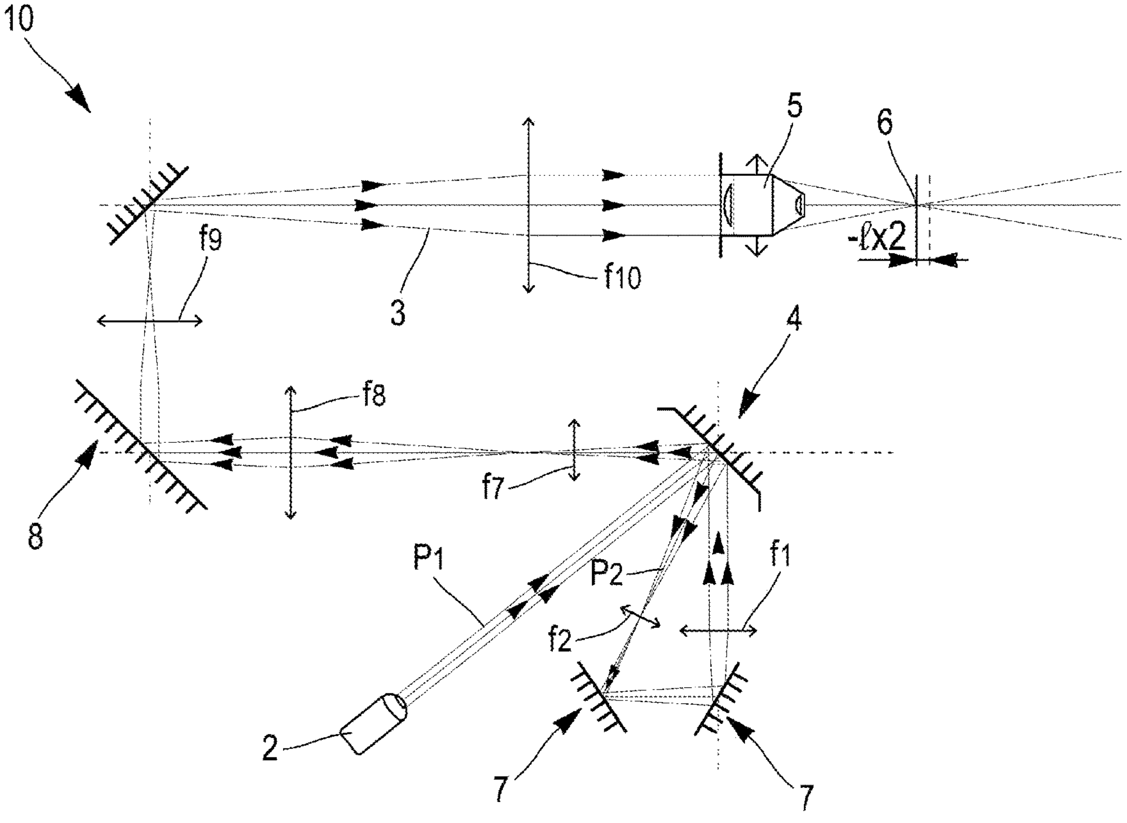

[Fig. 8]
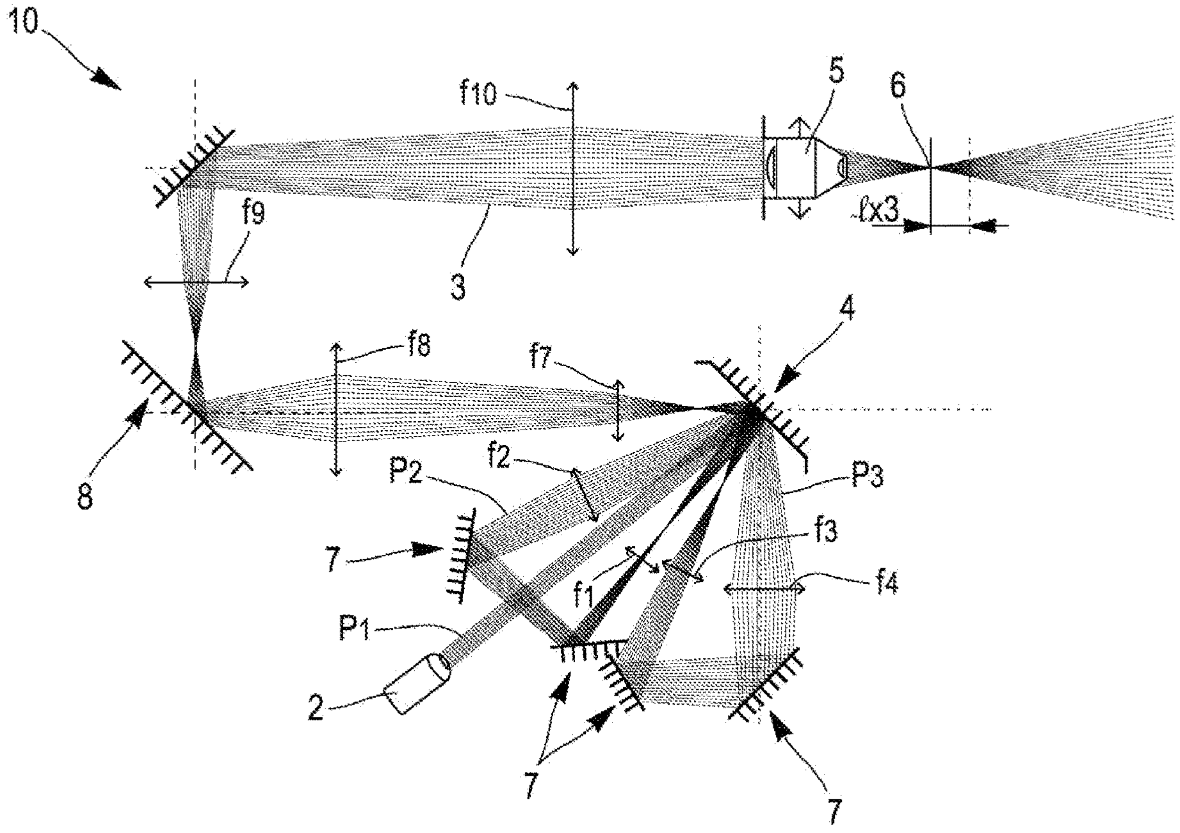
[Fig. 9]
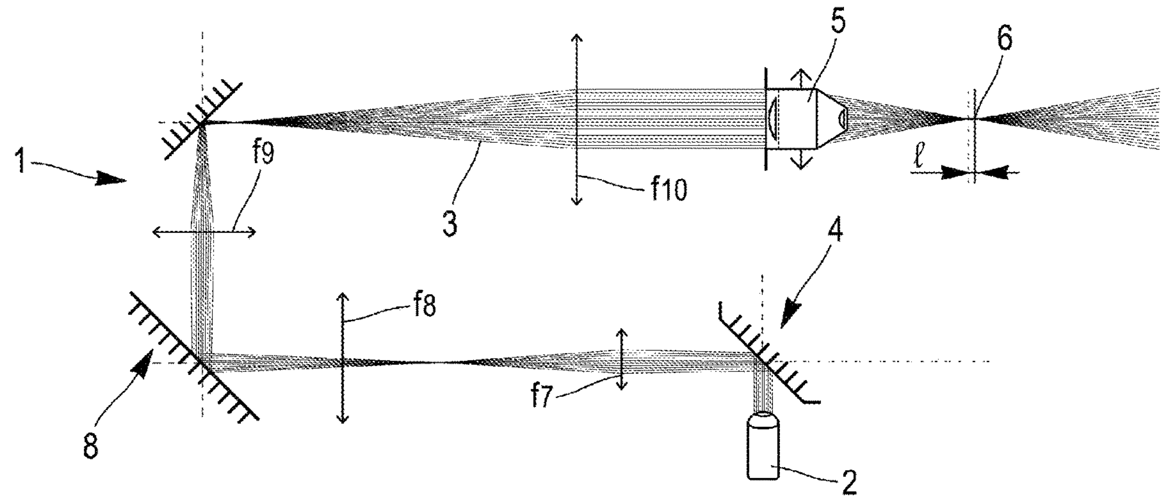

[Fig. 10]
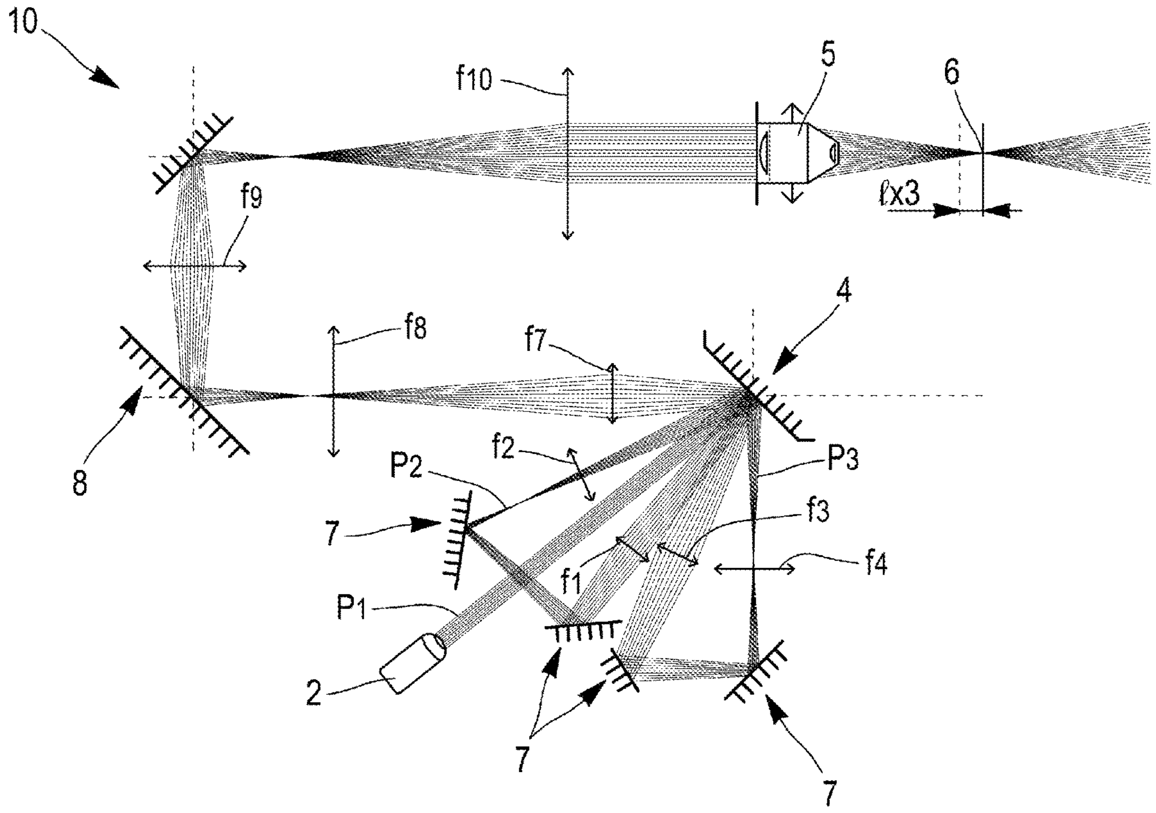

DEVICE FOR CONTROLLING THE AXIAL POSITION OF A LASER FOCAL POINT PRODUCED BY A MICROSCOPE OBJECTIVE

CROSS-REFERENCE TO RELATED APPLICATION

The present application is a filing under 35 U.S.C. 371 as the National Stage of International Application No. PCT/IB2020/001123, filed Oct. 29, 2020, entitled "DEVICE FOR CONTROLLING THE AXIAL POSITION OF A LASER FOCAL POINT PRODUCED BY A MICROSCOPE OBJECTIVE," which is incorporated herein by reference in its entirety for all purposes.

The present invention is related to a device for controlling the axial position of a laser focal point produced by a microscope objective. In particular, the device according to the invention can be used for different applications where high-speed 3D focal spot scanning is necessary such as optogenics, optical manipulation, confocal microscopy, two-photon microscopy or two-photon polymerisation.

It is usual to use an objective microscope to strongly focalize a laser beam. The location of the laser focal point is determined by the angle of incidence (in the planar axis X, Y) and the degree of collimation (in the axial axis Z) of the laser beam that reaches the entrance of the microscope objective. The quality of the focused laser spots (for instance in optical manipulation the stability of the traps) is very dependent on the quality of the beam that reaches the entrance of the microscope objective. However, given the correlation between the beam that reaches the objective and the focal point, it is difficult to change the three-dimensional position of the focal point without distorting its shape and introducing aberrations that will degrade its performance.

To overcome these constraints in the axial direction of the laser beam, it is known to use a deformable mirror which can focus or defocus the laser beam on the axial axis.

Deformable mirrors are mirrors whose curvature can be dynamically changed. They contain an array of actuators allowing a parabolic deflection of their surface, changing the mirror focal length.

However, deformable mirrors have a small surface deflection, with a maximum stroke of for instance of 5 μm, and a high settling times of for instance 5 ms (10-90%).

Consequently, the known devices are limited to a narrow working space of the laser focal point and a full scale bandwidth of the deformable mirror of for instance 200 Hz. These two limitations restrain the working space in which the laser focal point is produced and the scanning frequency at which the laser focal point can be moved between a set of arbitrary positions. This brings restrictions to the different applications, for instance in the imaging systems (such as confocal microscopy, multi-photon microscopy) the 3D scanning of planes at arbitrary orientation, curved surfaces, and targeted scanning are still challenges. In optical manipulation, this limits the number of traps that can be created and the size of the objects that can be out-of-plane rotated, for instance.

The present invention proposes to remedy these drawbacks.

To this end, a device for controlling the axial position of a laser focal point produced by a microscope objective comprises:

a laser source for emitting a laser beam, a deformable mirror for focusing or defocusing the laser beam axially, a microscope objective for focusing the laser beam coming from the deformable mirror on a laser focal point, The device according to the invention further comprises a system for passing the laser beam emitted by the laser source several times through the deformable mirror.

Thus, by passing the laser beam several times through the same deformable mirror, the focalisation (in the case of a concave configuration of the deformable mirror) or the defocalisation (in the case of a convex configuration of the deformable mirror) is amplified. Therefore, the convergence of the laser beam at the entrance of the microscope objective is increased (in the case of a concave configuration of the deformable mirror) or the divergence of the laser beam at the entrance of the microscope objective is increased (in the case of a convex configuration of the deformable mirror). Thus, the axial position of the laser focal point can be increased (in the case of a concave configuration of the deformable mirror) or decreased (in the case of a converging configuration of the deformable mirror). The invention allows the high-speed motion control of the laser focal point in a large working space. As for a given axial position, the deformable mirror has less amplitude of deformation (compared to the case in which the laser beam passes only once through the deformed mirror) the settling times of the system is reduced, increasing the scanning frequency. As the device is still solely based on mirrors, the light path is bidirectional, i.e. the path is independent from the propagation direction, and the optical efficiency is maximized.

The invention enlarges the actuation axis workspace by using several "virtual" deformable mirrors in series. The idea is to pass the laser beam several times through the same deformable mirror using for instance a set of mirrors. By ensuring that virtual deformable mirrors are placed on conjugate planes of the entrance aperture of the objective, it is possible to increase considerably the workspace, while ensuring that the size of the laser beam diameter at the entrance aperture of the objective remain the same, regardless the degree of convergence or divergence of the laser beam, and the movement of the laser focal point in the axial direction.

The system for passing the laser beam several times through the deformable mirror can comprise at least one set of two mirrors for guiding the laser beam between two successive passages of the laser beam on the deformable mirror.

The system for passing the laser beam several times through the deformable mirror advantageously comprises between two consecutive passages of the laser beam through the deformable mirror an optical relay system for conjugating the deformable mirror plane with the next deformable mirror plane between said two consecutive passages.

The optical relay system can comprise an afocal system with two positive lenses (or one negative and one positive lens).

The device can comprise a 2D planar scanning system for controlling the planar position of the laser focal point.

The planar scanning system is typically a galvanometer mirror.

The device can comprise a first optical relay system placed between the deformable mirror and the planar scanning mirror and a second optical relay system placed between the planar scanning mirror and the microscope objective, for conjugating the deformable mirror and the planar scanning mirror with the entrance aperture of the microscope objective.

The device can be an optical manipulation device, a two-photon polymerization device, a confocal microscopy device, a multi-photon microscopy device or an optogenetics device, or any other device that needs 3D fast scanning laser.

Figure 2:
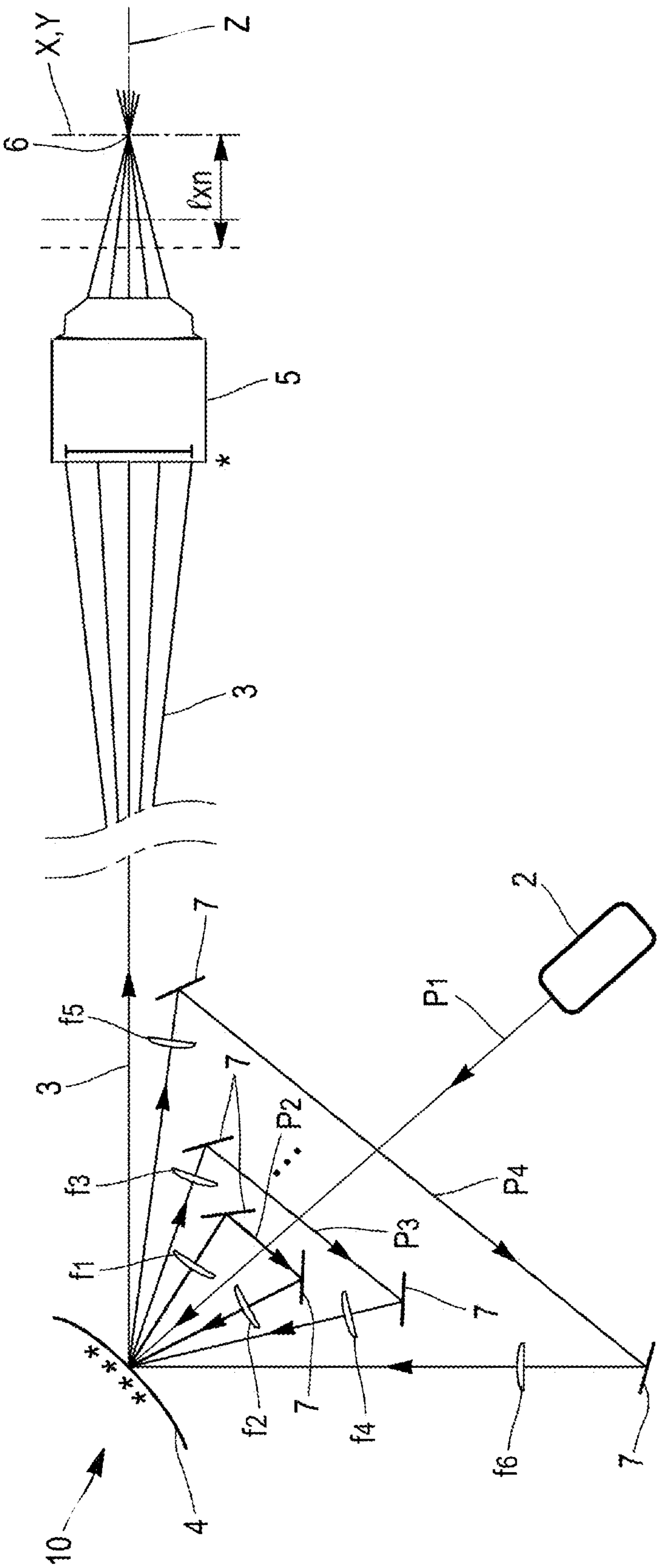

Other aims, features and advantages of the invention will emerge from reading the following description, given purely by way of non-limiting example, and with reference to the accompanying drawings in which:

FIG. 1 is a schematic view of a device for controlling the axial position of a laser focal point produced by a microscope objective according to the prior art, FIG. 2 is a schematic view of a device for controlling the axial position of a laser focal point produced by a microscope objective according to the invention, FIG. 3 is a partial view of the device of FIG. 2, FIG. 4 is a schematic view of a device with an actuation system according to the prior art, in a first embodiment, FIG. 5 is a schematic view of a device with an actuation system according to the invention, in a first embodiment, FIG. 6 is a schematic view of a device with an actuation system according to the prior art, in a second embodiment, FIG. 7 is a schematic view of a device with an actuation system according to the invention, in a second embodiment, FIG. 8 is a schematic view of a device with an actuation system according to the invention, in a second embodiment, FIG. 9 is a schematic view of a device with an actuation system according to the prior art, in a third embodiment, FIG. 10 is a schematic view of a device with an actuation system according to the invention, in a third embodiment, and FIGS. 11 to 15 represent schematically various embodiments of a device according to the invention.

As shown in FIG. 1, a device 1 for controlling the axial position of a laser focal point produced by a microscope objective according to the prior art comprises a laser source 2 which emits a laser beam 3.

The laser beam 3 passes through an actuation system for controlling the three-dimensional position of the laser focal point, i.e. in the axial Z direction as well as in the planar X, Y directions. It includes a deformable mirror 4 for controlling the axial Z position of the laser focal point and a galvanometer (not shown) for controlling the planar X, Y position of the laser focal point.

A microscope objective 5 is used to focus the laser beam 3 coming from the actuation system on the laser focal point 6 and to image the laser focal point 6.

The deformable mirror 4 which can focus or defocus the laser beam 3 is used on the Z axis. The deformable mirror 4 and the galvanometer are preferably positioned in a conjugate plane on the entrance aperture of the microscope objective 5. Hence, the laser beam 3 will pivot around the entrance aperture of the microscope objective 6 and retain the same degree of overfilling, independently of the angle or the degree of collimation of the incident beam 2, producing equally and efficient laser focal points 6. The conjugate planes are pictured by the symbols "*".

When the deformable mirror 4 is in a flat configuration (position 4*a* in FIG. 1), the microscope objective 5 focuses the laser beam 3 on the laser focal point 6*a*. When the deformable mirror 4 is not in a flat configuration, for instance when it is in a convex configuration, as shown in FIG. 1, the microscope objective 5 focuses the laser beam 3 on the laser focal point 6. The laser focal point 6 is located a distance 1 from the laser focal point 6*a*.

According to the invention, and as shown in FIG. 2, the device 10 further comprises a system for passing the laser beam 3 coming from the laser source 2 several times through the deformable mirror 4.

The system can include a plurality of mirrors 7. For instance, two reflecting mirrors 7 can be used between two successive passages of the laser beam 3 on the deformable mirror 4.

The laser beam 3 coming from the laser source 2 is directed to the deformable mirror (passage P1 of the laser beam 3). Then a second passage P2 of the laser beam 3 is performed using two mirrors 7. In the same manner, successive passages P3 and P4 are then carried out. Of course the number of passages is not limited and thus Pn passages can be carried out in the same manner.

Thus, by passing the laser beam 3 coming from the laser source consecutively several times through the deformable mirror 4, the defocalisation is amplified and therefore the angle of the laser beam at the entrance of the microscope objective is increased. Thus, the axial position of the laser focal point 6 is increased. 1 being the axial position of the laser focal point 6 from the axial position of the laser focal point 6*a* in the case of a flat configuration of the deformable mirror 4 (FIG. 1), the axial position of the laser focal point 6 from the axial position of the laser focal point 6*a* when the laser beam passes four times through the deformable mirror 4 is around 4*l. More generally, the axial position of the laser focal point 6 from the axial position of the laser focal point 6*a* after n passages of the laser beam through the deformable mirror 4 is approximately l*n.

Deformation of the deformable mirror is used to changing their focal length as well as compensating for optical aberrations.

The workspace and the bandwidth are dependent of the used deformable mirror. In current system, the full working range of the axial displacement is estimated for instance as 10 μm between the maximal and minimal defocusing position of the deformable mirror and can be performed at 200 Hz for instance (limited by the time of travel of the mirror between his maximal position to his minimal position). For small relative displacements in the z axis (below 2 μm, for instance), the sampling rate can be increased (typically to 2 kHz) as the deformable mirror maximal and minimal deformation is smaller.

With the invention, using the same deformable mirror, if the laser beam is deflected six times through the deformable mirror, the axial workspace will be approximatively of 60 μm at 200 Hz or around 12 μm at 2 KHz. Therefore, this new solution will enlarge the working space and also the bandwidth.

At each passage of the laser beam 3 through the deformable mirror 4, the deformable mirror 4 is advantageously conjugated with the entrance aperture of the microscope objective 5. To this end, the system for passing the laser beam 3 several times through the deformable mirror 4 can comprise between two consecutive passages of the laser beam 3 through the deformable mirror an optical relay for conjugating the deformable mirror 4 with the deformable mirror 4 itself. The optical relay system can be an afocal system with a set of two positive lens, where the distance between the two lens is equal to the sum of each element's focal length.

For the passage P2, the beam coming from the deformable mirror 4 passes successively through a first lens f1, a first mirror 7, a second mirror 7, a second lens f2 and the deformable mirror 4 again. For the passage P3, the beam coming from the deformable mirror 4 passes successively through a first lens f3, a first mirror 7, a second mirror 7, a second lens f4 and the deformable mirror 4 again. For the passage P4, the beam coming from the deformable mirror 4 passes successively through a first lens f5, a first mirror 7, a second mirror 7, a second lens f6 and the deformable mirror 4 again.

As shown in FIG. 3, for instance for a passage P4, d1 is the length of the laser beam 3 path between the deformable mirror 4 and a first lens f1, d2 is the length of the laser beam 3 path between the first lens f1 and the second lens f2, d3 is the length of the laser beam 3 path between the second lens f2 and the deformable mirror 4, f1 being the focal length of the first lens f1 and f2 being the focal length of the second lens f2.

In the afocal system (d2=f1+f2), two successive passages of the laser beam 3 on the deformable mirror 4 are conjugated if d1, d2, d3, f1 and f2 satisfy the following relation (with the thin-lens formalism):

$$d1=f1/f2*(f1+f2-f1/f2*d3)$$

To image the same surface diameter of the deformable mirror in each passage, the magnification of the afocal telescope can be set to 1:1. In this case f1=f2, then d1=2f1−d3. If d3=f1, then d1=f1, making the optical relay system a 4f system.

As illustrated on FIG. 4, an actuation system controls the three-dimensional position of the laser focal point 6, i.e in the axial Z direction as well as in the planar X, Y directions. It includes the deformable mirror 4 and a galvanometer 8 which are used to control the axial Z and the planar X, Y positions of the laser focal point 6 respectively.

The deformable mirror 4 which can focus or defocus the laser beam 2 is used on the Z axis. The deformable mirror 4 and the galvanometer 8 are preferably positioned in a conjugate plane on the entrance aperture of the microscope objective 5. Hence, the laser beam 3 will pivot around the entrance aperture of the microscope objective 5 and retain the same degree of overfilling, independently of the angle and the degree of collimation of the incident beam 3.

The deformable mirror 4 can be a microelectromechanical component with 111 actuators and 37 piston-tip-tilt segments with an update rate of 2 kHz. Each segment has 700 μm diameter while the array has an aperture of 3.5 mm and with a maximum dynamic range (Stroke) of 5 μm. Electrostatic actuation allows precise positioning of each segment with nanometer and microradian resolution (wavefront resolution <15 nm rms).

The laser beam 3 is guided into the microscope objective 5 through the galvanometer 8, the deformable mirror 4, and standard optical elements. Two afocal systems with lens f7, f8 and f9, f10 are preferably used to conjugate the two actuators 4, 8 with the entrance aperture of the microscope objective 5 and to expand the laser beam 3.

FIGS. 4 and 5 show the deformable mirror 4 is in a flat configuration. FIG. 4 illustrates a laser beam 3 passing one time through the deformable mirror 4 whereas FIG. 5 illustrates a laser beam 3 passing three times through the deformable mirror 4. The laser focal point 6 has the same axial position in FIG. 4 and in FIG. 5.

In a second embodiment, as illustrated in FIGS. 6, 7 and 8, the deformable mirror 4 is in a focalisation configuration (i.e. the deformable mirror 4 is in a concave configuration). When the laser beam 3 passes one time through the deformable mirror 4 (FIG. 6), the axial position of the laser focal point 6 is decreased from l compared to the laser focal point reference when the deformable mirror is in a flat configuration (FIG. 4). When the laser beam 3 passes two times through the deformable mirror 4 (FIG. 7), the axial position of the laser focal point 6 is decreased from around 2l compared to the laser focal point reference when the deformable mirror 4 is in a flat configuration. When the laser beam 3 passes three times through the deformable mirror 4 (FIG. 8), the axial position of the laser focal point 6 is decreased from around 3l compared to the laser focal point reference when the deformable mirror 4 is in a flat configuration.

In a third embodiment, as illustrated in FIG. 9 and the deformable mirror 4 is in a defocalisation configuration (i.e. the deformable mirror 4 is in a convex configuration). When the laser beam 3 passes one time through the deformable mirror 4 (FIG. 9), the axial position of the laser focal point 6 is increased from l compared to the laser focal point reference when the deformable mirror is in a flat configuration (FIG. 4). When the laser beam 3 passes three times through the deformable mirror 4 (FIG. 10), the axial position of the laser focal point 6 is increased from around 3l compared to the laser focal point reference when the deformable mirror 4 is in a flat configuration.

The actuation system as described above can be used in several devices according to the invention.

Figure 11:
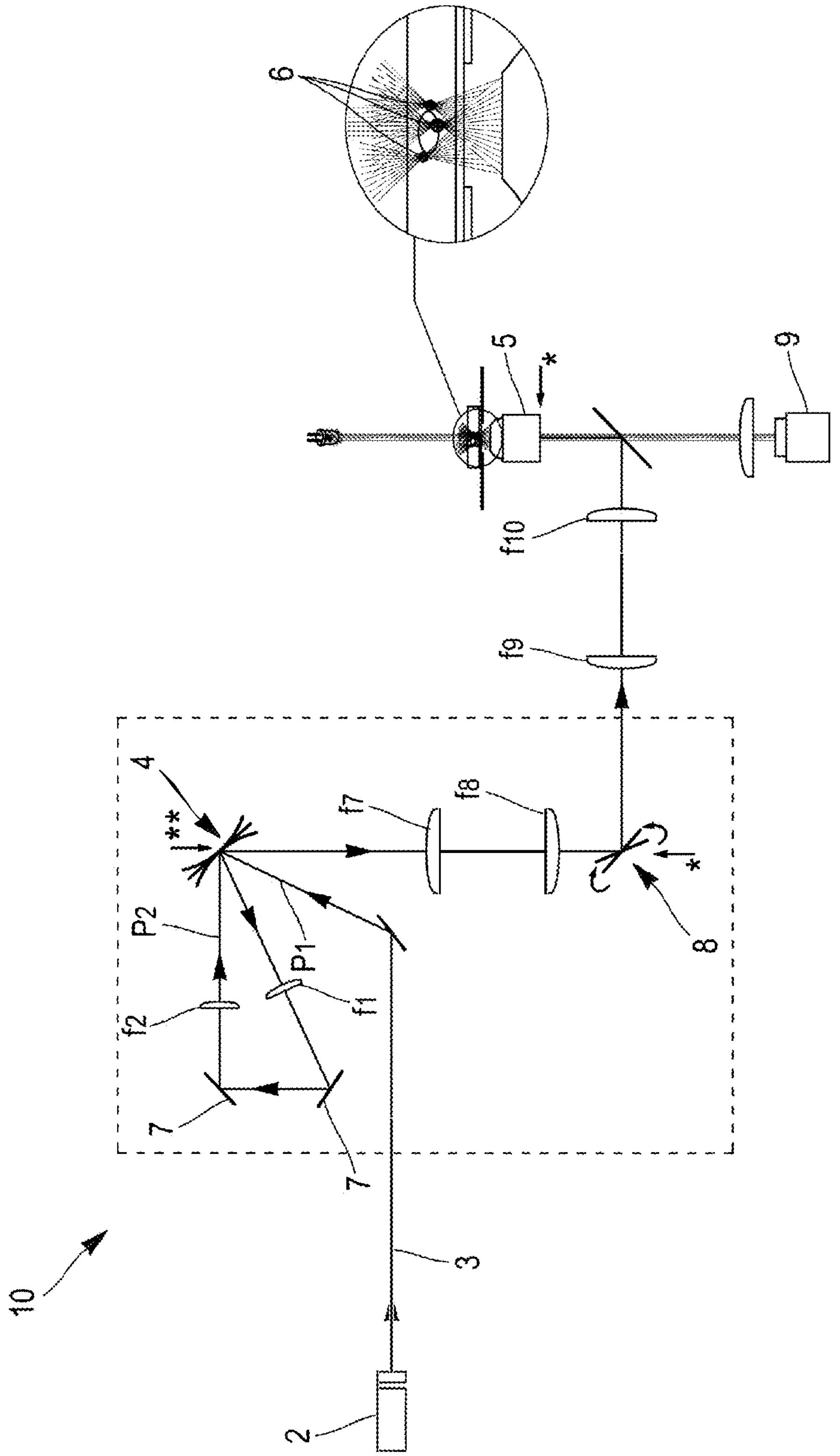

The device 10 according to the invention can be used for optical manipulation, typically for trapping a plurality of objects (FIG. 11). In this case, the laser beam 3 is deflected by the actuation system 4, 8 between several trapping points 6. A camera 9 determines the position of each of the trapped objects.

Figure 12:
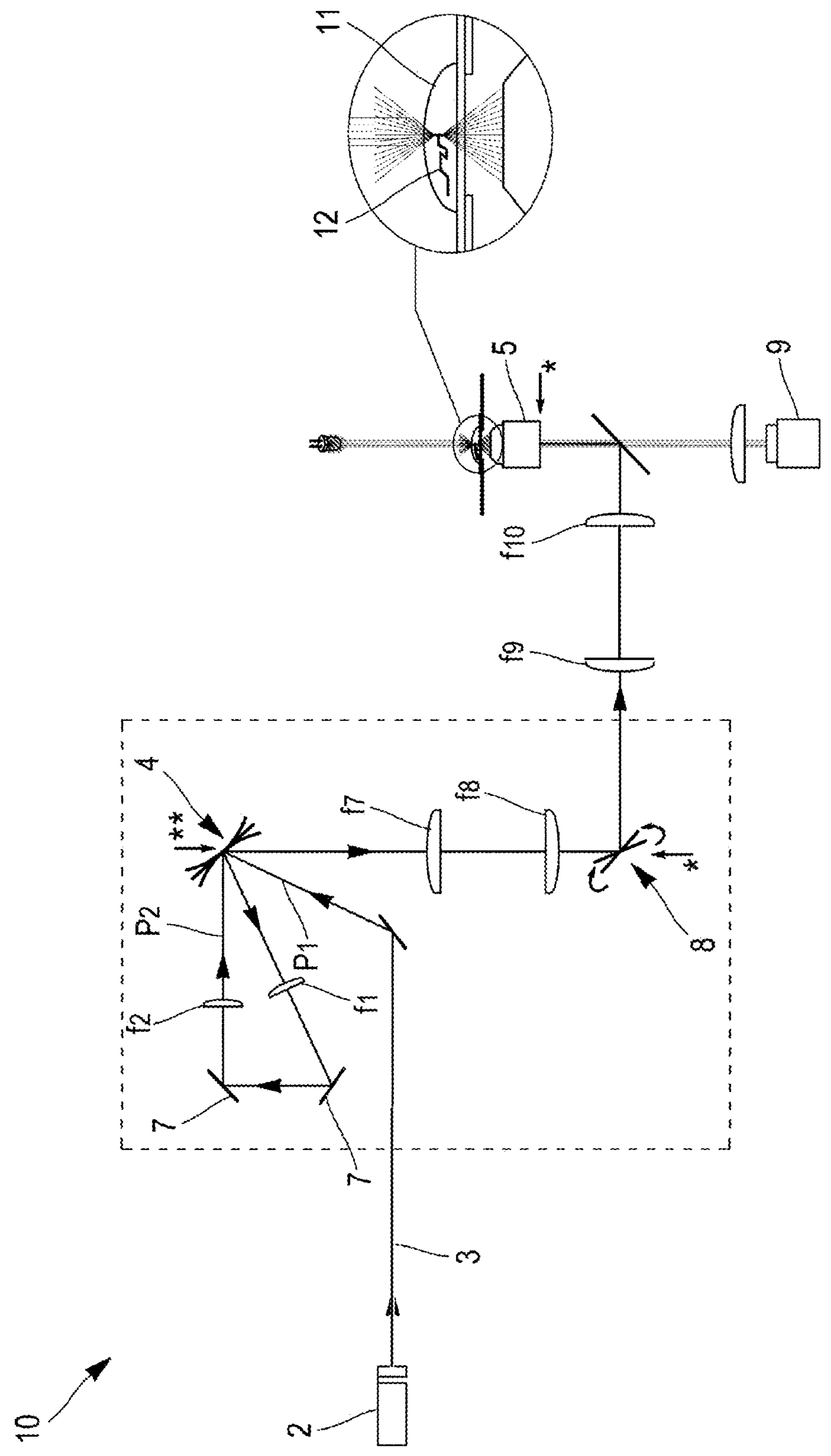

As illustrated in FIG. 12, the device 10 according to the invention can be used for multi-photon polymerization.

Two photons or more can be absorbed simultaneously by a photo-sensitive polymer 11 in a very small volume called "voxel" at the laser focal point 6. A chemical reaction starts, and the liquid monomer becomes a solid polymer inside the voxel and a structure 12 is formed.

Figure 13:
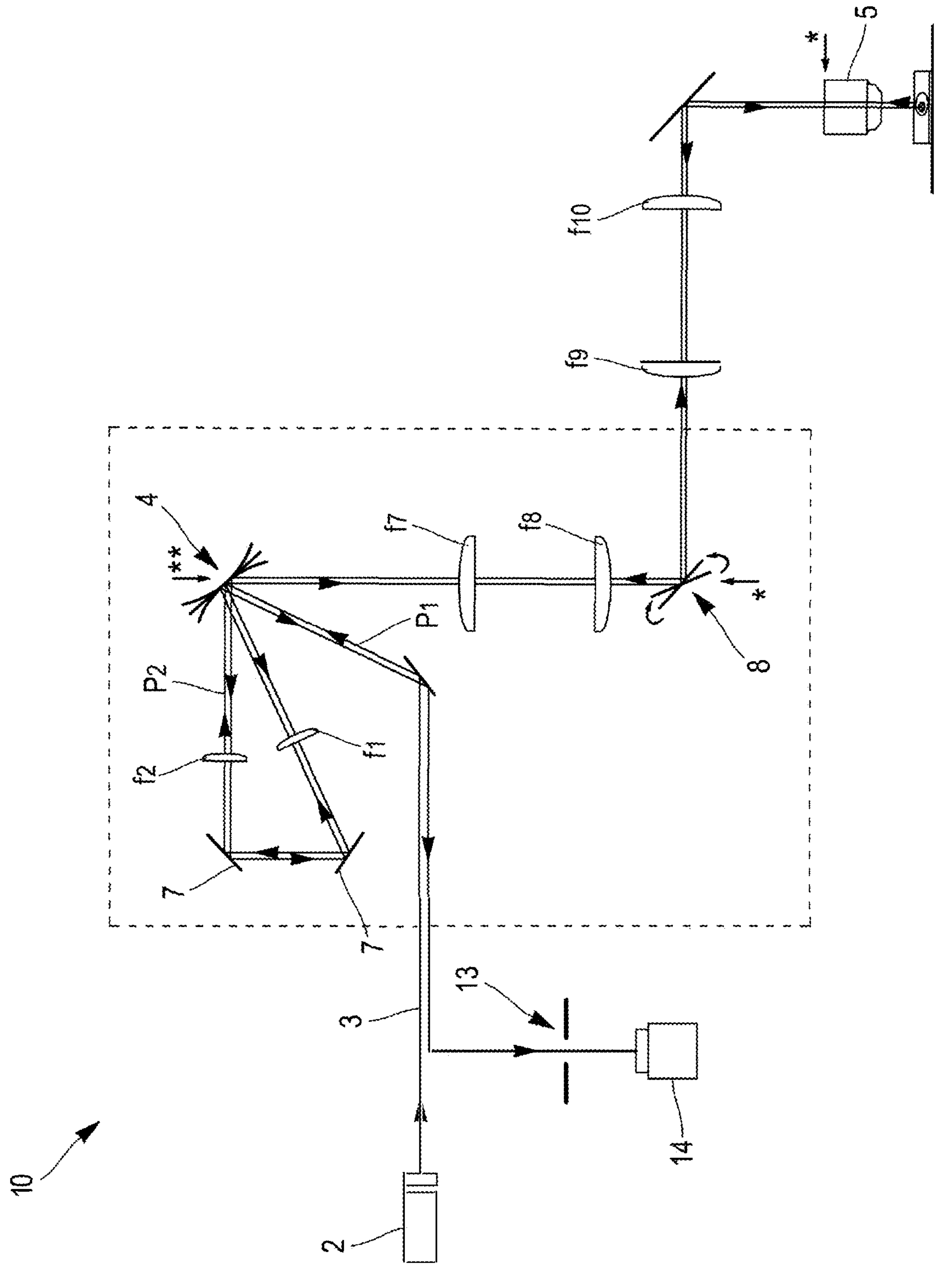

In another embodiment, the device 10 is a confocal microscopy device (FIG. 13). Confocal microscopy is an optical imaging technique for increasing optical resolution and contrast of a micrograph by means of using a spatial pinhole 13 to block out-of-focus light in image formation.

As the system advantageously only uses mirrors, and the light path is bidirectional, the detector can be used in a "descanned" configuration, where the emitted light returns along the same path as the excitation laser beam. Capturing multiple two-dimensional images at different depths in a sample with a high-sensitivity detector 14, such as a photomultiplier tube enables the reconstruction of three-dimensional structures within an object.

Figure 14:
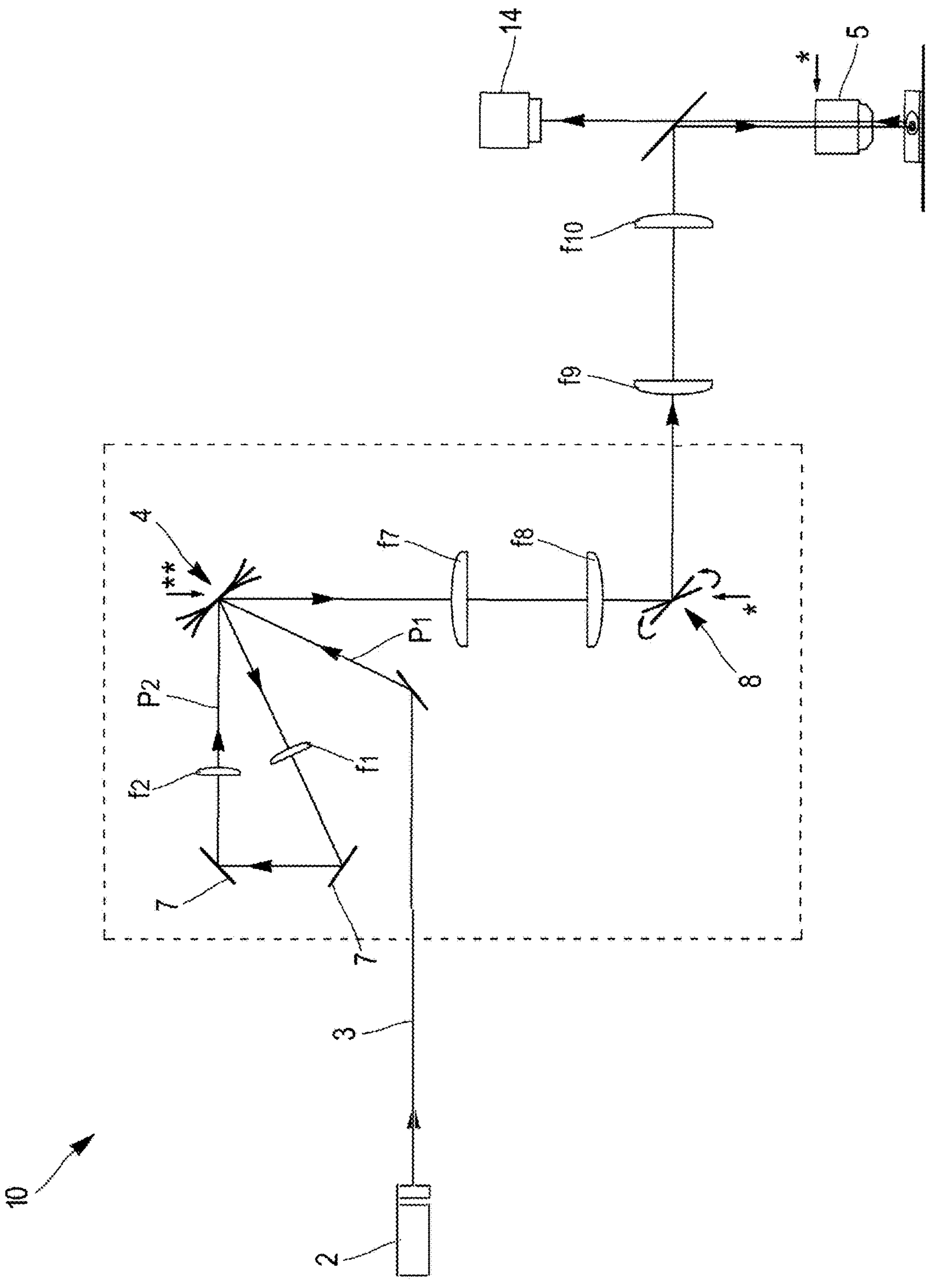

In another embodiment, the device 10 is a multi-photon microscopy device (FIG. 14). Two-photon excitation microscopy is a fluorescence imaging technique that allows imaging of living tissue up to about one millimeter in thickness. Unlike traditional fluorescence microscopy, in which the excitation wavelength is shorter than the emission wavelength, two-photon excitation requires simultaneous excitation by two photons with longer wavelength than the emitted light. Two-photon excitation microscopy typically uses near-infrared excitation light which can also excite fluorescent dyes. The fluorescence from the sample is then collected by a light detector 14, such as a photomultiplier tube.

Figure 15:
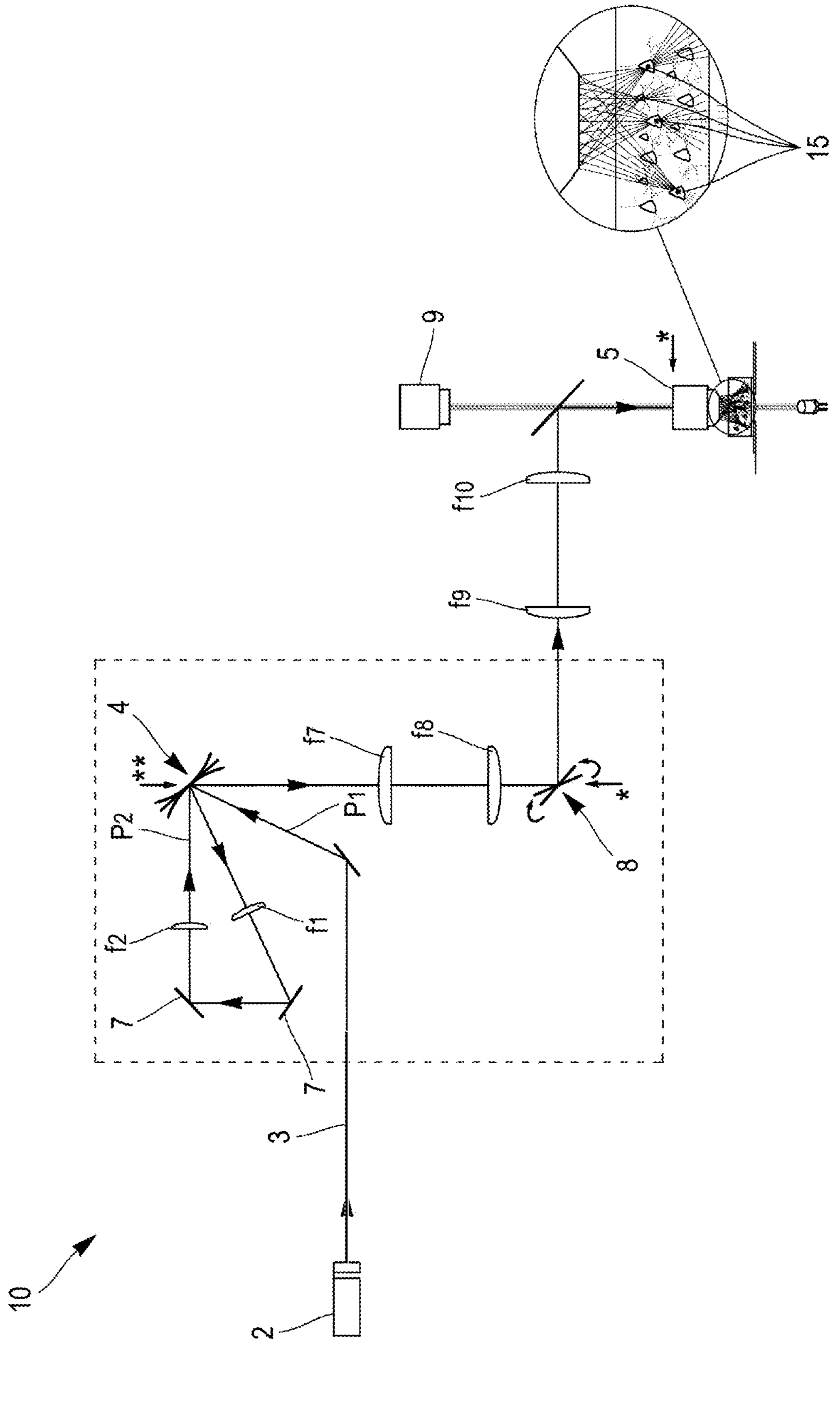

In a last embodiment, the device 10 is an optogenetics device using a camera 9 (FIG. 15). Optogenetics most commonly refers to a biological technique that involves the use of light to control neurons that have been genetically modified to express light-sensitive ion channels. Thus, the laser beam 3 is used for activating photosensitive cells 15.

The invention claimed is:

1. Device for controlling the axial position of a laser focal point produced by a microscope objective, comprising:

a laser source for emitting a laser beam, a deformable mirror for focusing or defocusing the laser beam axially, a microscope objective for focusing the laser beam coming from the deformable mirror on a laser focal point, a system for guiding the laser beam emitted by the laser source several times on the deformable mirror, the system for guiding the laser beam several times on the deformable mirror comprising at least one set of two mirrors for guiding the laser beam between two successive reflections of the laser beam on the deformable mirror, and an optical relay system (f1, f2; f3, f4; f5, f6) for conjugating the deformable mirror plane with the next deformable mirror plane between said two consecutive reflections.

2. Device according to claim 1, wherein the optical relay system (f1, f2; f3, f4; f5, f6) comprises an afocal system with two positive lenses or one negative and one positive lens.

3. Device according to claim 1, comprising a planar scanning system for controlling a planar (X, Y) position of the laser focal point.

4. Device according to claim 3, wherein the planar scanning system is a galvanometer mirror.

5. Device according to claim 3, comprising a first optical relay system ($f_7$, $f_8$) placed between the deformable mirror and the planar scanning system and a second optical relay system ($f_9$, $f_{10}$) placed between the planar scanning system and the microscope objective, for conjugating the deformable mirror and the planar scanning system with the entrance aperture of the microscope objective.

6. Device according to claim 1, wherein the device is an optical manipulation device, a two-photon polymerization device, a confocal microscopy device, a two-photon microscopy device or an optogenetics device.

* * * * *